United States Patent
Takemoto et al.

Patent Number: 5,707,237
Date of Patent: Jan. 13, 1998

[54] DRIVING SIMULATION SYSTEM

[75] Inventors: Takatoshi Takemoto; Kazunari Kawashima, both of Tokyo, Japan

[73] Assignee: Kabushiki Kaisha Ace Denken, Tokyo, Japan

[21] Appl. No.: 537,678

[22] PCT Filed: Apr. 20, 1994

[86] PCT No.: PCT/JP94/00650

§ 371 Date: Oct. 20, 1995

§ 102(e) Date: Oct. 20, 1995

[87] PCT Pub. No.: WO94/24652

PCT Pub. Date: Oct. 27, 1994

[30] Foreign Application Priority Data

Apr. 20, 1993 [JP] Japan .................. 5-091715

[51] Int. Cl.$^6$ .................. G09B 9/05
[52] U.S. Cl. .................. 434/69; 434/63; 434/71; 463/6; 463/36; 463/39; 364/578; 446/456; 348/121; 348/208
[58] Field of Search .................. 434/29, 60–71, 434/365; 463/6.7, 35, 36, 39; 446/454, 456; 364/578; 348/208, 745, 746, 747, 121; 352/243

[56] References Cited

U.S. PATENT DOCUMENTS

| | | |
|---|---|---|
| 3,871,113 | 3/1975 | Crago et al. . |
| 4,026,038 | 5/1977 | Sunter et al. .................. 434/29 |
| 4,214,381 | 7/1980 | Clark et al. .................. 434/67 |
| 4,512,745 | 4/1985 | Mohon et al. . |
| 4,685,649 | 8/1987 | McKay .................. 352/243 X |
| 4,713,697 | 12/1987 | Gotou et al. .................. 348/208 |
| 4,817,948 | 4/1989 | Simonelli .................. 434/63 X |
| 4,986,187 | 1/1991 | Booth et al. .................. 434/63 X |
| 5,006,072 | 4/1991 | Letovsky et al. .................. 434/69 X |
| 5,015,189 | 5/1991 | Wenzinger et al. .................. 434/62 X |
| 5,184,956 | 2/1993 | Langlais et al. .................. 434/69 |
| 5,209,662 | 5/1993 | Fujita et al. .................. 434/69 X |
| 5,277,584 | 1/1994 | DeGroat et al. .................. 434/62 X |
| 5,456,604 | 10/1995 | Olmsted et al. .................. 434/62 |
| 5,547,382 | 8/1996 | Yamasaki et al. .................. 434/69 X |

FOREIGN PATENT DOCUMENTS

| | | |
|---|---|---|
| 0 406 729 A2 | 1/1991 | European Pat. Off. . |
| 0 423 934 A2 | 4/1991 | European Pat. Off. . |
| 0 564 368 A1 | 10/1993 | European Pat. Off. .................. 434/69 |
| 2 677 155 | 12/1992 | France . |
| 52-6650 | 2/1977 | Japan . |
| 56-14988 | 4/1981 | Japan . |
| 56-40556 | 4/1981 | Japan . |
| 1-69266 | 5/1989 | Japan . |
| 2-310414 | 12/1990 | Japan . |
| 2 128 842 | 5/1984 | United Kingdom . |
| WO 91/11792 | 8/1991 | WIPO . |

*Primary Examiner*—Joe Cheng
*Attorney, Agent, or Firm*—Seed and Berry LLP

[57] ABSTRACT

A simulation system which can provide a realistic quasi-experience of operating a conveyance.

An output information collecting device 3 is provided with a conveyance model 20 which operates according to the operation information accepted from outside. The conveyance model 20 comprises a television camera 30 which shoots the surrounding scenery and a accelerometer 40 which detects the acceleration. A simulator body 4 is provided with a cockpit device 50, a driving section 70 which changes the cockpit device, and an output section 220 which displays the picture shot by the television camera 30. The cockpit device 50 includes an input section for operating, 60, which accepts the operation information to operate the conveyance model 20. A driving section 70 changes the cockpit device 50 based on the information of acceleration informed by the accelerometer 40.

14 Claims, 12 Drawing Sheets

Fig. 3A
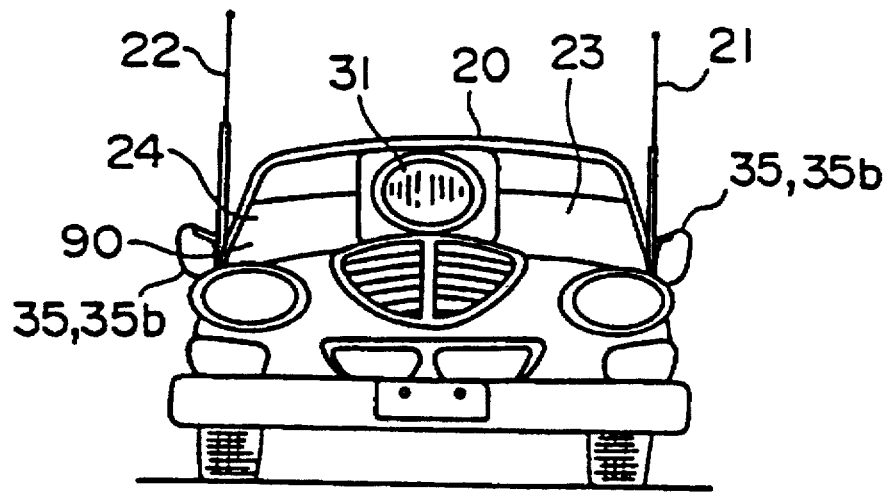
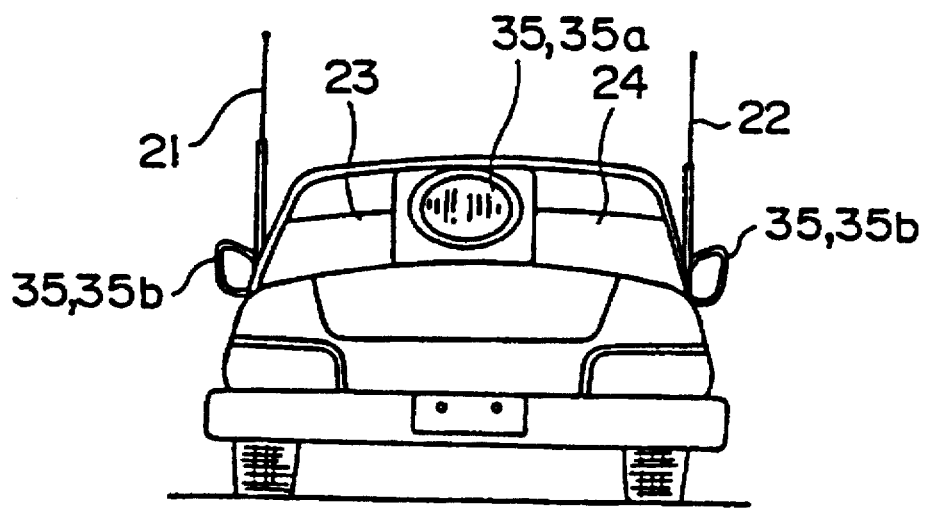
Fig. 3B

DRIVING SIMULATION SYSTEM

FIELD OF THE INVENTION

The present invention relates to a simulation system to be used for trial driving etc.

DESCRIPTION OF THE RELATED ART

In conventional simulation systems, it is common to project an animation sequence composed by computer graphics onto the screen in front of a user.

However, this kind of conventional simulation system has a problem of not being able to obtain realism as the picture viewed by the user is only an animation.

SUMMARY OF THE INVENTION

In view of the previous problems, the object of the present invention is to provide a simulation system which excels in realistic portrayal.

To attain the above object, the present invention provides a simulation system which comprises a simulator body which simulates an operation of the conveyance, an output information collecting device for collecting the information outputted to said simulator body, and a communication circuit which connects said simulator body to said output information collecting device.

The output information collecting device of the simulation system of the present invention comprises a conveyance model operated according to the operation information received from the outside. The above conveyance model comprises a television camera which shoots the surrounding view to be passed to the simulator body, and an acceleration detector which detects the acceleration of the conveyance model to be passed to the simulator body.

The above simulator body of the simulation system in the present invention comprises a cockpit device comprising an operating seat, a driving section which displaces the above cockpit device, and an output section which displays the picture taken by the above television camera. The above cockpit device comprises an input section for driving which receives the input of the operation information that operates the above conveyance model. The above driving section displays the cockpit device according to the information of acceleration received from the above acceleration detector.

The output section comprises a displaying device provided at the front section of the above cockpit device and a projector which projects the picture taken by the television camera to the above displaying device, wherein the above projector is preferably supported in such a condition that it is not subject to influence of the displacement of the above cockpit device. Further, the above projector may be supported at a section different from the cockpit device, or it may comprise a vibration eliminating mechanism. A vibration eliminating mechanism which comprises an optical axis changing mechanism that changes the direction and the position of the optical axis may be used. The above optical axis changing mechanism displaces the optical axis projected by the above projector to cancel the displacement of the cockpit device by the above driving section.

Further, the above television camera comprises a shooting section, wherein the above shooting section comprises a photoelectric conversion mechanism which converts light to electric signals, an optical system which conducts the image of the subject to the above photoelectric conversion mechanism, and an incident light path changing mechanism which changes the path of the light within the above optical system. It is preferable that the above conveyance model detects the degree of deflection based on the information of acceleration received from the above acceleration detector and comprises a controlling mechanism in the light path changing mechanism which changes the light path of the incident light according to the above degree of deflection so that the light emitted from a certain position of the project or will be incident at a certain position of the above photoelectric conversion mechanism in spite of the deflection.

It is preferable that the above television camera comprises a front television camera which shoots to the front and a rear television camera which shoots to the rear, wherein said output section further comprises a rearview-mirror-form displaying device and side-mirror-form displaying devices at the left and right. The picture shot by the above front television camera is displayed on the displaying device provided at the front section of the above cockpit device. One section of the picture shot by the rear television camera is displayed on the above rearview-mirror-form displaying device, and a remaining section is displayed on either the left or the right of the side-mirror-form displaying device; and at least one of the remaining sections is displayed on the other above side-mirror-form displaying device.

Furthermore, the above television camera comprises a front television camera which shoots to the front and a rear television camera which shoots to the back. The rear television camera may comprise a television camera for side-mirrors which comprises lenses for shooting at each of the left/right positions of the side-mirrors in the above conveyance model and a television camera for the rearview-mirror which comprises lenses for shooting at the center section of the above conveyance model, wherein the pictures shot by the front television camera are displayed on the displaying device provided at the front section of the above cockpit device, the pictures shot by the above television camera for the rearview-mirror are displayed on the above rearview-mirror-form displaying device, the pictures shot by the lens for shooting at the right side of the above television camera for side-mirrors are displayed on the above rearview-mirror-form displaying device at the right, and the pictures shot by the lens for shooting at the left side of the above television camera for side-mirrors are displayed on the above rearview-mirror-form displaying device at the left.

The above driving section comprises a controlling section for the driving section which controls the above front/rear moving mechanism, both sides moving mechanism, and the up/down moving mechanism to simulate the acceleration of the conveyance model at the above cockpit device, based on the size and direction of the acceleration of the above conveyance model informed by a front/rear moving mechanism which displaces the above cockpit device at the front and the rear, a both sides moving mechanism which displaces the above cockpit device to the left and the right, an up/down moving mechanism which displaces the above cockpit device up and down, and the above acceleration detector.

The above conveyance model and the above cockpit device may be a model of a car. They may also be a model of a ship where the above running area is a water tank. Moreover, the conveyance model may be a model of a train where the cockpit device is a model of a locomotive and the running area is provided with a model of a railroad.

When the player controls the input section for operating, the conveyance model remote controlled by the control section based on the operation information received via the input section for operating runs the model on the running area. The television camera loaded on the conveyance model views the scenery of the running area seen from the conveyance model. Similarly, the acceleration detector loaded on the conveyance model detects the inclination, vibration, etc., of the running conveyance model as acceleration. When the acceleration detector detects the inclination, vibration, etc., of the conveyance model, the driving section inclines and vibrates the cockpit device based on the detecting signal.

Further, the picture of the running area sent from the television camera is stabilized by the controlling mechanism, and the projector is arranged in such a way that it is not influenced by the displacement of the cockpit device. Accordingly, the inclination and vibration of the running area picture sent from the television camera is prevented from being displayed on the display screen; the picture is displayed on the display screen in a stable condition.

When the above conveyance model is a model of a car which is loaded with each of the front television camera and the rear television camera, the picture sent from the rear television camera is displayed on each of the rearview-mirror-form liquid crystal television and the side-mirror-form liquid crystal television of the simulator body.

The picture sent from the front television camera is projected on the above front picturing screen by the projector provided on the simulator body.

When the driving section comprises a two sides moving mechanism, a front/rear moving mechanism and an up/down moving mechanism, the both sides moving mechanism and the front/rear moving mechanism moves the cockpit device to both sides, to the front and rear, and/or up and down, so that the player can feel the acceleration and deceleration in the side directions or the front/rear directions. Further, the driving section may decide the moving speed and moving direction according to the acceleration of the conveyance model, or based on the operation information received by the input section for operating. In this way, inclinations and vibrations of the conveyance can be reproduced.

BRIEF DESCRIPTION OF THE DRAWINGS

FIG. 3(a) is a front view of the conveyance model in an embodiment of the present invention.

FIG. 3(b) is a rear view of the conveyance model in an embodiment of the present invention.

PREFERRED EMBODIMENTS OF THE INVENTION

The embodiments of the present invention will be explained below, according to the figures.

Figure 2:
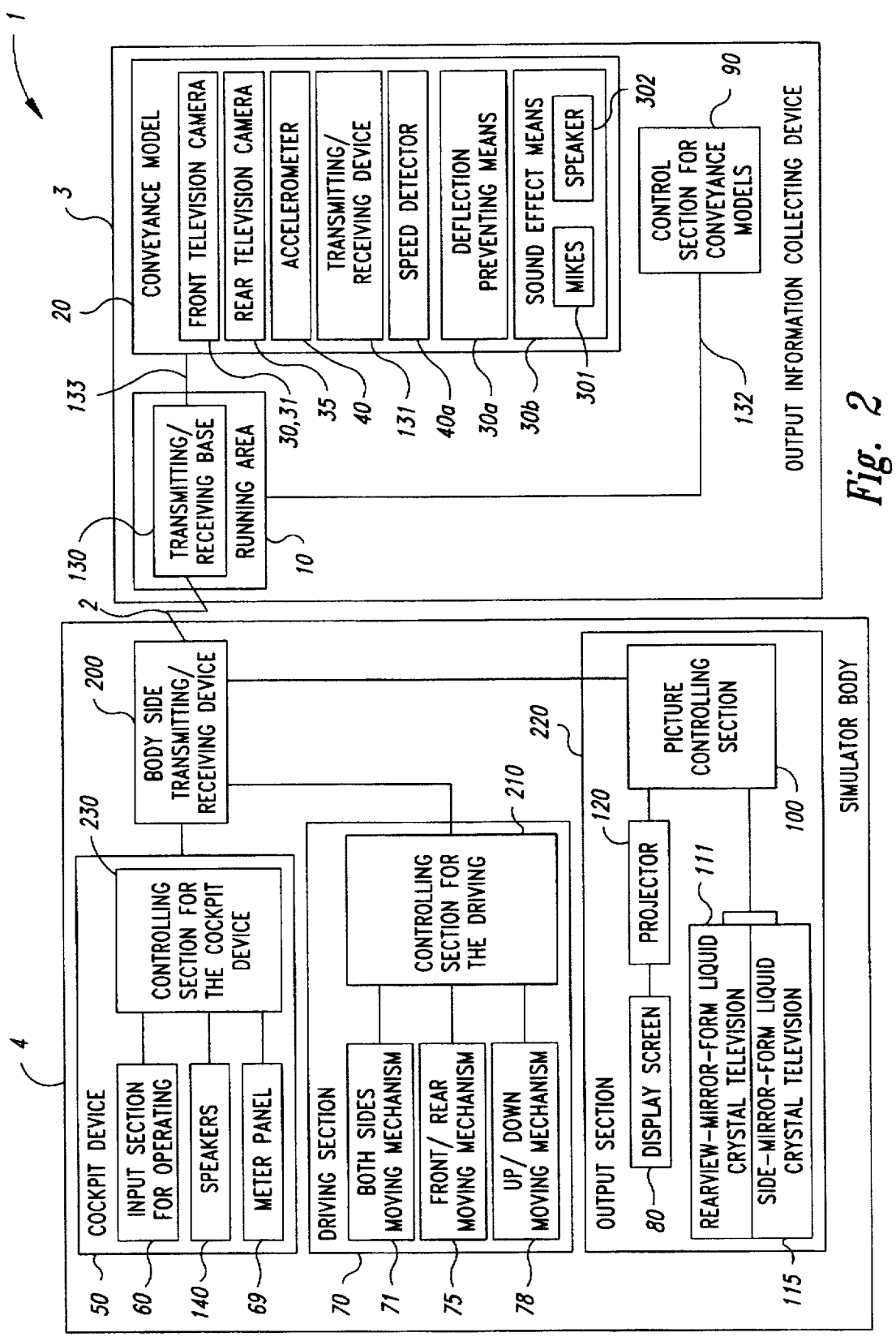
FIG. 2 is a configuration diagram which shows the construction of the simulation system in an embodiment of the present invention.

The simulation system 1 of the present embodiment comprises an output information collecting device 3 and a simulator body 4 as shown in FIG. 2. The output information collecting device 3 and the simulator body 4 are connected via the communication circuit 2 to send/receive information. The communication circuit 2 may either be wired or wireless. In the present invention the communication circuit 2 is wired via a body side transmitting/receiving machine 200 and the transmitting/receiving base 130.

A) The Constitution of the Simulation System in the Present Embodiment (1) Output Information Collecting Device The output information collecting device 3 of the present invention comprises the conveyance model 20, a model of a running area 10, and transmitting circuits 132 and 133. The transmitting circuits 132 and 133 can either be wired or wireless. In the present invention, the transmitting circuit 132 is wired and the transmitting circuit 133 is wireless. In the present embodiment, a model of a car which can be remote controlled is used as the conveyance model 20.

a) Running Area

Figure 4:
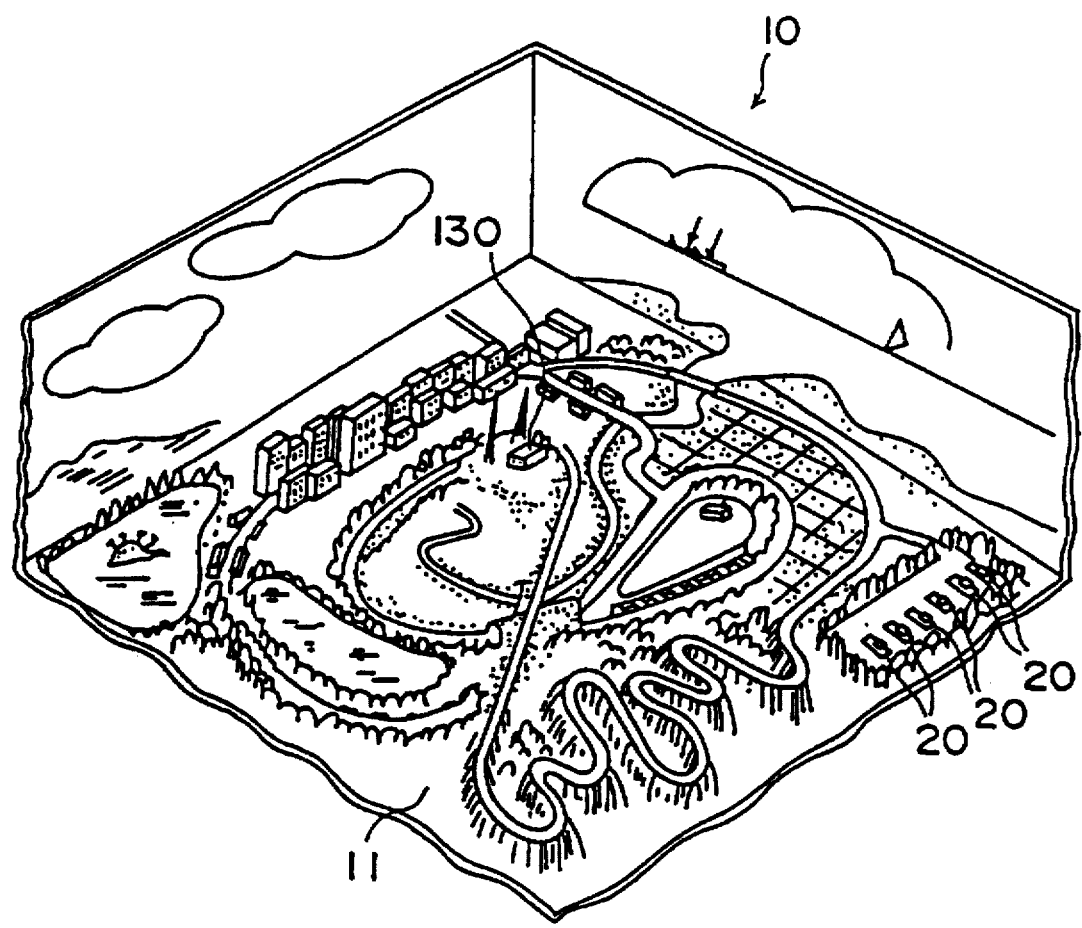
FIG. 4 is a bird's-eye view in part of the running area (running course model of cars) in an embodiment of the present invention.

The running area 10 is an area in which to operate the conveyance model 20. In the present embodiment it is provided with a running course 11 for the remote control car 20 as shown in FIG. 4. At the center section of the running course 11, a transmitting/receiving base 130 for transmitting the collected information (picture information, speed information, vibration information, and inclination information) of the conveyance model 20 and for receiving an operation information that operates the conveyance model 20 are provided. In the present embodiment, the communication between the body side transmitting/ receiving machine 200 and the transmitting/receiving base 130 is done by a wired circuit 2, but the communication between the conveyance model 20 and the transmitting/ receiving base 130 is done by a wireless circuit 133 as stated above.

Figure 5:
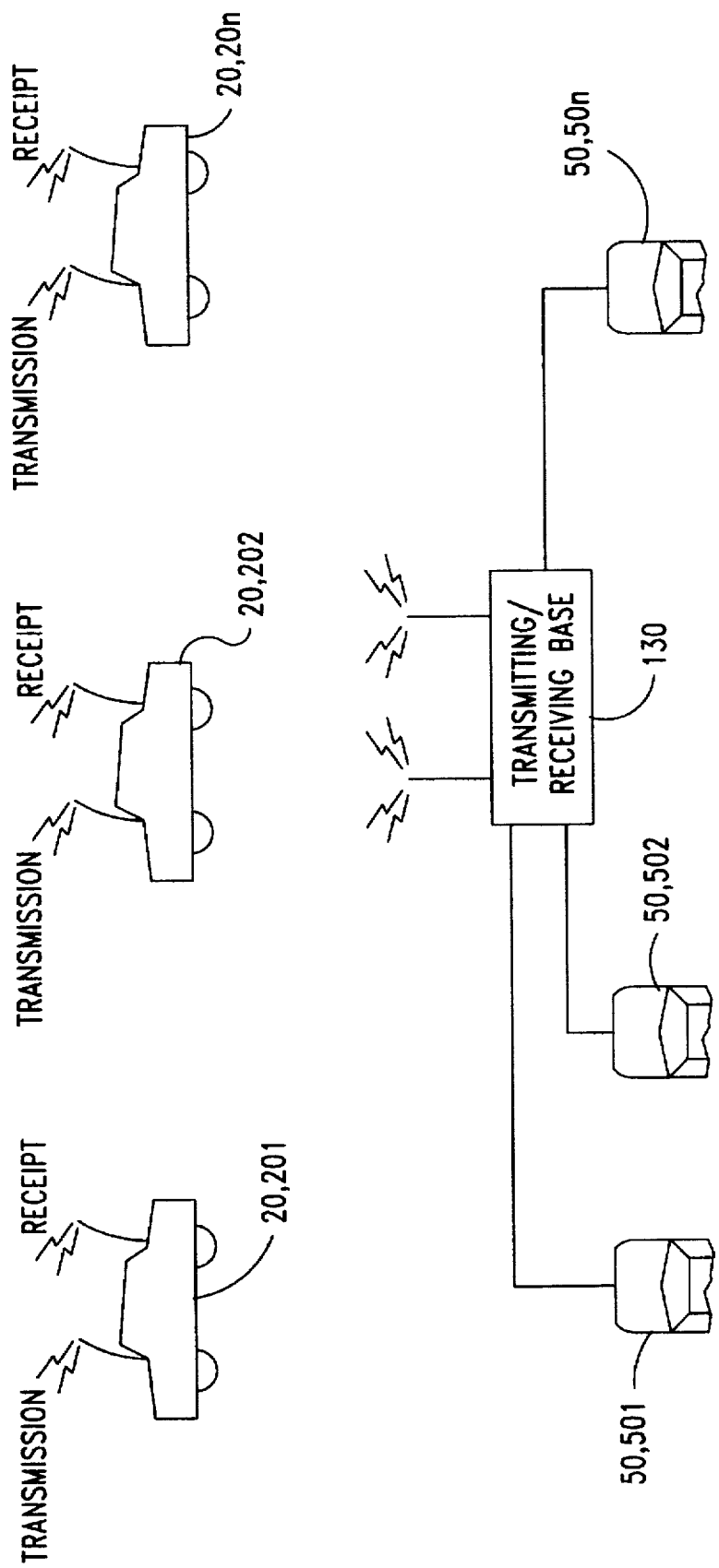
FIG. 5 is a general view which shows the communication circuit of an embodiment of the present invention.

Though it is possible for the simulation system 1 to comprise its individual running area 10, a single running area 10 is shared by a plurality of simulation systems in the present embodiment. In other words, a plurality of conveyance models 20 are operated within one running course 11. In this case, as shown in FIG. 5, wireless communications between each of the conveyance models 20 (201, 202, . . . 20n) and the simulator bodies 50 (501, 502, . . . 50n) assigned to each conveyance models are conducted at a single transmitting/receiving base 130. In the present embodiment, therefore, the frequencies of the signals are made to be different for each conveyance model 20 so that each conveyance model 20 is communicated to the simulator body 4 respectively assigned to each of them to prevent contact. Other means may be used, however, to have a one-to-one communication between each conveyance model 20 and each simulator body 4.

Since the player can see the surrounding scenery of the conveyance model 20 as a picture displayed on the output section 220 during the simulation, the running course 11 is preferably a course full of changes, including roads through a town, mountains, seaside area, and a lake side area, and passing tunnels and bridges.

In the present embodiment, speakers (not shown) are provided at a number of places within the running course 11 so that the sound of the environment can be made according to the condition (town, seaside, mountainside, etc) of the place where the speaker is provided.

The user can run the conveyance model 20 within the running course 11 by controlling direction, speed, etc. as he/she likes. In the present embodiment, since the conveyance model 20 controlled by other users can run within the same running course 11, quasi-experience of various cases which can happen during driving a car, etc., such as taking over another models 20, being taken over by other models 20, and passing other models 20 coming from the front can be gained without actually driving a car. Further, by providing models of traffic signs according to the actual traffic regulations along the running course 11, the player can practice driving following the traffic regulations.

Figure 13:
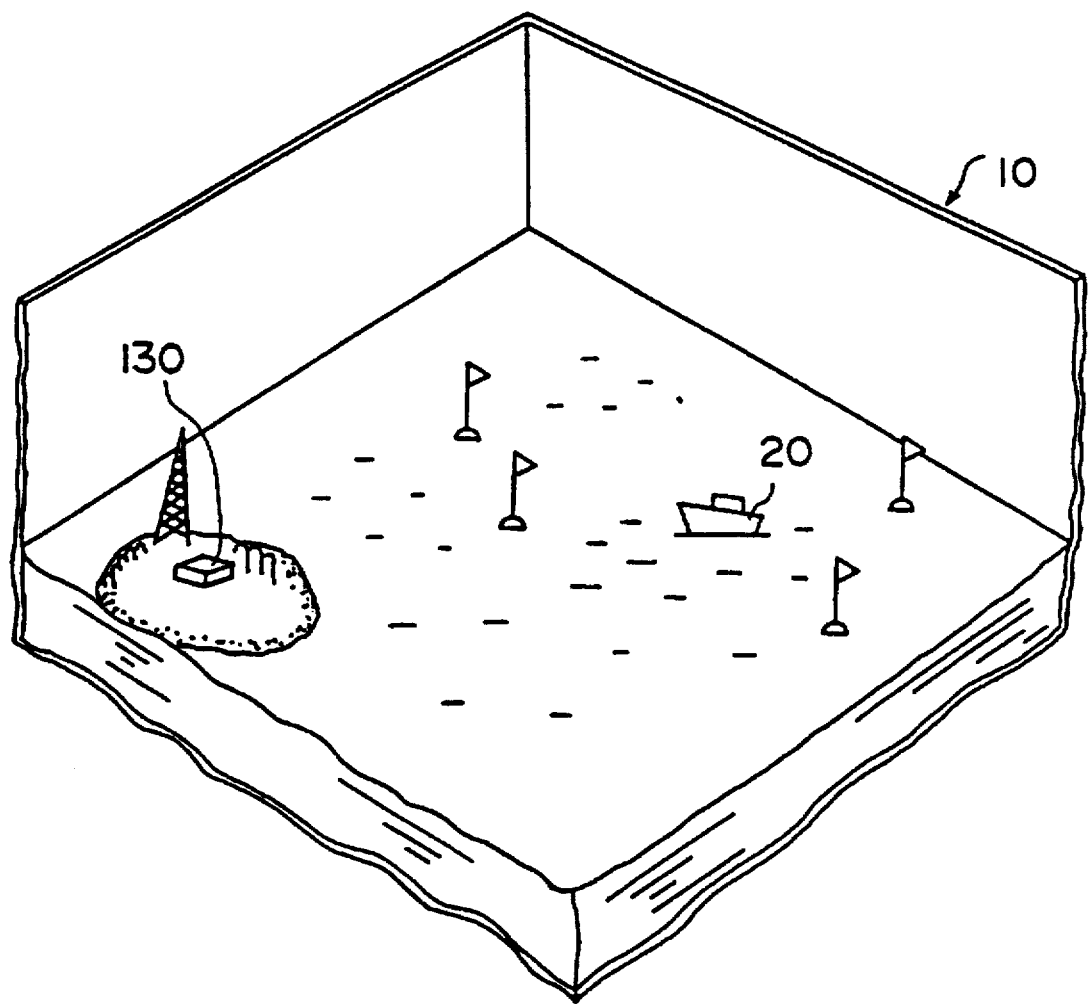
FIG. 13 is a bird's-eye view in part of the running area (transportation course model of ships) in an embodiment of the present invention.
Figure 14:
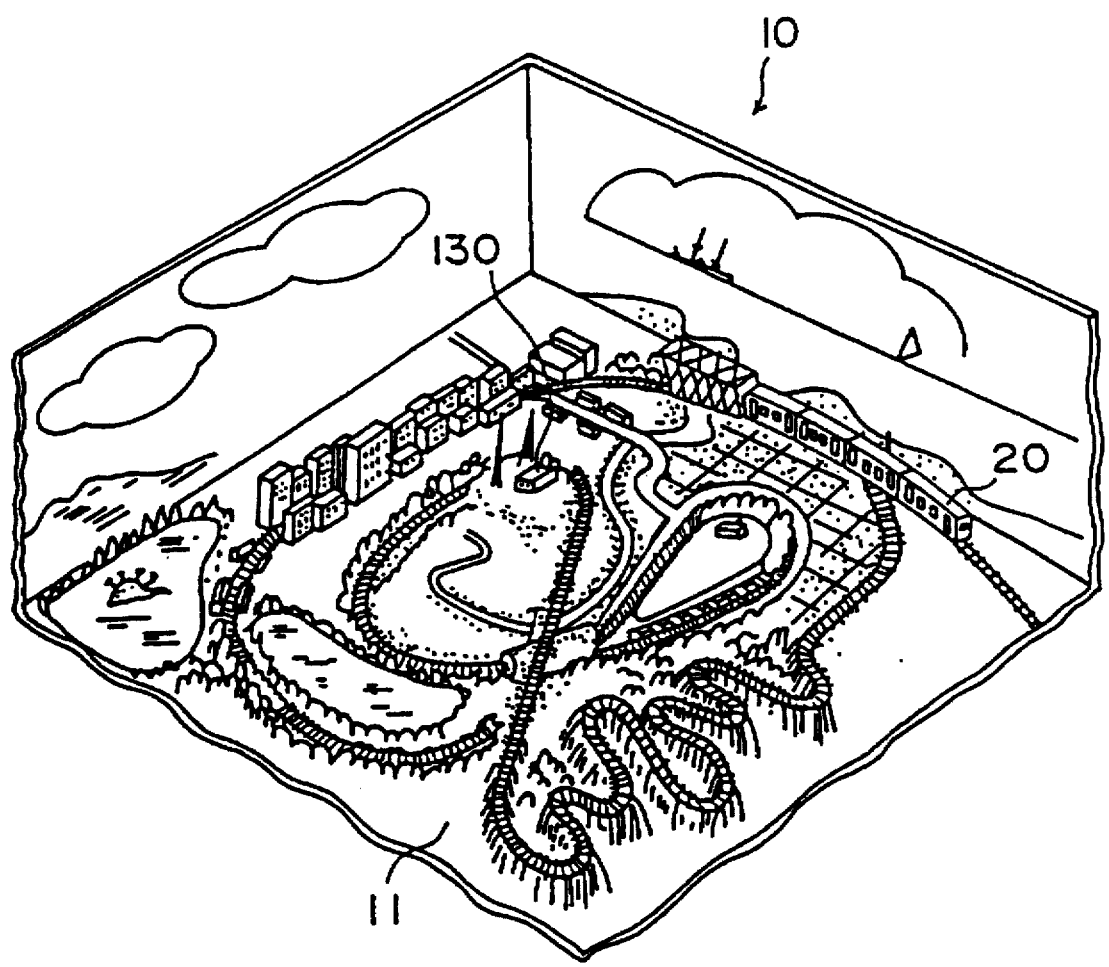
FIG. 14 is a bird's-eye view in part of the running area (railroad line model) in an embodiment of the present invention.

The running course 11 may be an imitation of a racing ground or rally field. An imaginary field which cannot be run easily in the ordinary world may be set as the running course 11 to produce courses in volcanic or earthquake areas, deserts, and wetlands. When the conveying model 20 and the cockpit device 50 is a model of a ship, a water tank as shown in FIG. 13 is provided as the running area 10. If the conveying model 20 and the cockpit device 50 is a model of a locomotive a running area 10 which comprises a railroad is provided as the running course 11 as shown in FIG. 14. The conveyance model 20 may also be a train where the cockpit device is an imitation of the motorman's cab of a train.

Moreover, by providing the transmitting/receiving base 130 in real fields etc., they may be used as the running area 10, and no special running course 11 has to be made.

b) Conveyance Model

The conveyance model 20 comprises a television camera 30 for obtaining picture information received from the outside, an accelerometer 40 which is an acceleration detector for measuring inclinations and the vibrations of the conveyance model 20, a deflection preventing means 30a for preventing the deflection of the picture to be shot, a sound effect means 30b, a transmitting/receiving device 131, and a driving system 134.

The conveyance model 20 of the present embodiment is a remote control car which comprises a driving system 134 for moving inside the running course. The driving section 134 comprises a battery (not shown) and a driving motor (not shown) driven by the electric power supplied by the battery so that it runs by rotating the wheels by the rotation of the driving motor. The driving motor is rotated at a speed corresponding to the instructions of the control section for conveyance models, 90. A gasoline engine may be used as a driving motor instead of the electric motor in the present embodiment. The conveyance model 20 of the present embodiment comprises a means which changes the directions of the wheel according to the instructions of the angles from the control section for conveyance models, 90, received via the transmitting/receiving device 131.

As an accelerometer 40, one which uses a gyrocompass may be used. The accelerometer 40, which is electronic in the present invention, detects the inclination, vibration, acceleration, and deceleration of the car body and the centrifugal force generated when changing the moving direction of the car body to pass them to the simulator body via the transmitting/receiving base 130. Other acceleration detectors may also be used as a means for detecting the acceleration.

The speed detector 40a in the present embodiment detects the speed, running distance, and the rotation of the tire of the remote control car which is the conveyance model 20 and passes such information to the simulator body via the transmitting/receiving base 130.

The television camera 30 comprises a front television camera 31 and rear television cameras 35. One rear television camera 35 is for the rearview mirror while the other rear television camera 35 is for the side mirrors. On the remote control car 20 of the present invention, as shown in FIG. 3(a), the front television camera is provided at the center of the front seat of the conveyance model 20 to shoot the view in front of the conveyance model 20. Each of the lenses for shooting of the television cameras 35b for the side mirrors is provided at the position of the door mirrors at the left and right to shoot the rear of the conveyance model 20 from the left and right side, respectively. The television camera 35a for the rearview mirror, as shown in FIG. 3(b), is provided at the center of the back seat to shoot the rear of the conveyance model.

Deflection is generated on the picture shot by the television camera 30 when the remote control car 20 inclines or vibrates. Therefore, a light path changing means (not shown) is provided on each of the television cameras 31, 35a, and 35b. Deflection preventing means 30a is a means for changing the light path of the incident light via the light path changing means of each of the television cameras 30 according to the degree of deflection based on the information of deflection received from the accelerometer 40 so that the light emitted from a certain position of the project will be incident at a certain position of the photoelectric conversion means of the camera in spite of the deflection.

The conveyance model 20 of the present embodiment comprises a sound effect means 30b. The sound effect means 30b comprises four to six mikes 301 and one speaker 302. The sound effect means 30b generates the sound of the engine from the speaker 302. It also collects sounds of the surroundings (artificial sounds of the environment given out from the speaker 302 provided in the running area, sounds given out by the other conveyance model 20 near by, etc.) through the microphone 301 and passes the sound information to the simulator body 4 via the transmitting/receiving base 130 and the communication circuit 2.

The transmitting/receiving device 131 exchanges information with the transmitting/receiving base 130 via the wireless transmitting circuit 133. The transmitting/receiving device 131 comprises a transmitting antenna 21, a transmitter 23, a receiving antenna 22, and a receiver 24. These are shown in FIG. 3(a) and FIG. 3(b). The control signal to the conveyance model 20 (a signal for controlling the operation) is transmitted to the transmitting/receiving base 130 from the control section for conveyance models, 90, via the wired transmitting circuit 132, transmitted to the transmitting/ receiving device 131 (i.e. transmitted to the receiver 24 via the receiving antenna 22) from the transmitting/receiving base 130 via the wireless transmitting circuit 133, and finally passed from the transmitting/receiving device 131 to the driving system 134. The output signals (picture information, sound information, acceleration information, etc.) are transmitted from the transmitting/receiving device 131 (i.e. transmitted from the transmitter 23 via the transmitting antenna 21) to the transmitting/receiving base 130 via the wireless transmitting circuit 133, and from the transmitting/receiving base 130 to the simulator body.

c) Transmitting/receiving Base

The output information collecting device 3 of the present embodiment, as shown in FIG. 2, is provided with a transmitting/receiving base 130 and a control section for conveyance models, 90.

The information collected from the television cameras 30, the accelerometer 40, the speed detector 40a and the sound effect means 30b is passed to the simulator body 4 via the transmitting/receiving base 130 and the communication circuit 2.

At the transmitting/receiving base 130, a transmitting antenna 21 and a transmitter 23 which transmits the data measured by the accelerometer 40 and the speed detector 40a are provided as well as a receiving antenna 22 and receiver 24 for receiving the operation information. These are shown in FIG. 3(a) and FIG. 3(b). The rod antennas provided as a transmitting antenna 21 and a transmitter 23 in the present embodiment may be embedded into or adhered to the floor or the roof of the car body so that they do not appear to be obstructive. Similarly, the antenna of the transmitting/receiving base 130 may be provided on the road and the like. In this way, the transmission may be carried out with weaker radio waves because an antenna longer than one set at a high place may be set.

d) Control Section for Conveyance Models

The control section for conveyance models, 90, operates the conveyance model 20 within the running area 10 using the operation information received via the transmitting/ receiving base 130. In the present embodiment, the control section for conveyance models, 90, is connected to the transmitting/receiving base 130 via the wired transmitting circuit 132, and the transmitting/receiving base is connected to the conveyance model 20 via the wireless transmitting circuit 133. The control section for conveyance models, 90, generates a control signal based on the operation signal to pass it to the conveyance model 20 via the wired transmitting circuit 132, the transmitting/receiving base 130, the wireless transmitting circuit 133, and the transmitting/ receiving device 131 to control the driving system of the conveyance model 20.

(2) Simulator Body a) Output Section

The output section 220 comprises a display screen 80 set up in front of the cockpit device 50, a rearview-mirror-form liquid crystal television 111 provided within the cockpit device 50, two side-mirror-form liquid crystal televisions 115 provided on the planes at both sides of the cockpit device 50, a projector 120, and a picture controlling section 100.

The picture controlling section 100 projects the front scenery taken by the front television camera 35 of the conveyance model 20 onto the display screen 80. In this way, the scenery supposed to be seen from the driver's seat of the conveyance model can be seen from the driver's seat in the cockpit device 50.

Figure 1:
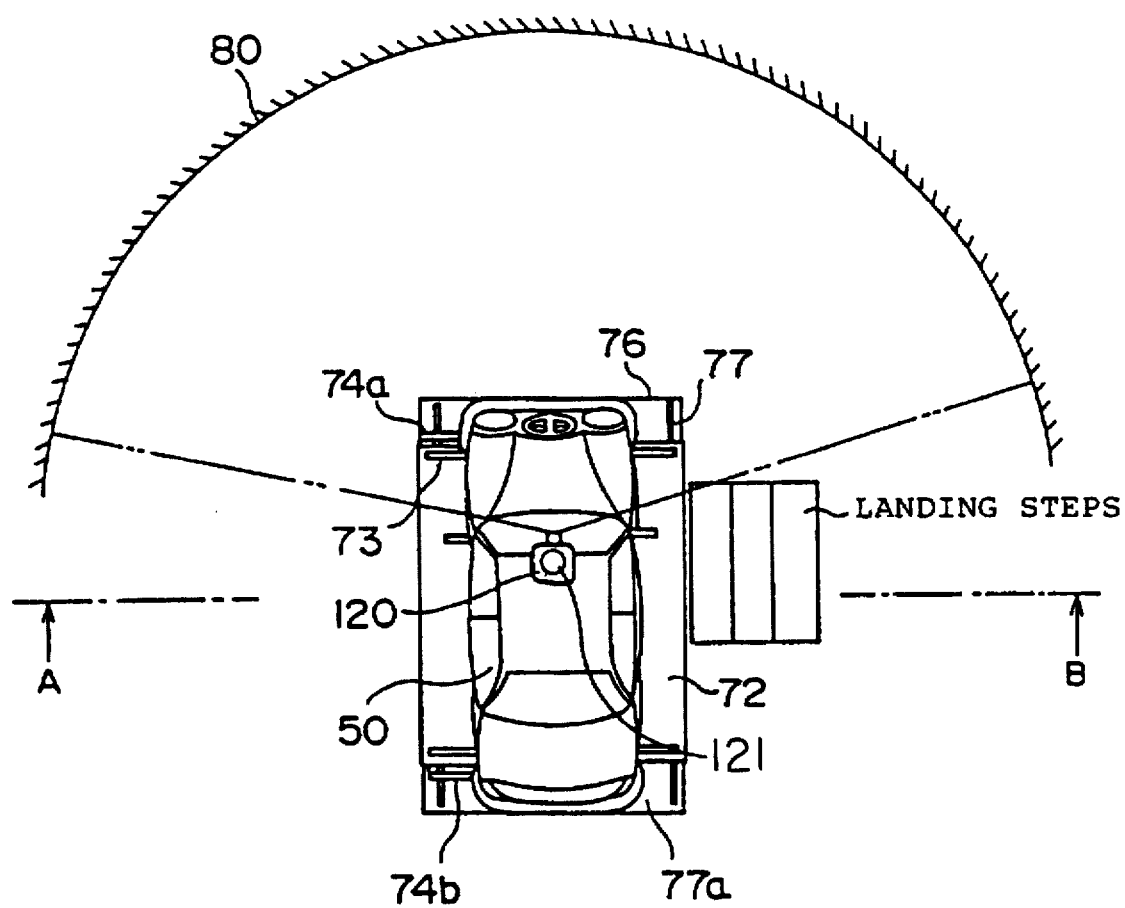
FIG. 1 is a plane figure showing the body of the simulator in an embodiment of the present invention.

The optical axis projected by the projector 120 is supported in such a way that it will not be influenced by vibrations or inclinations of the cockpit device 50. In the present embodiment, as shown in FIG. 1, the projector 120 is fixed at the front upper section at the outside of the cockpit device 50, and the display screen 80 is provided at the front of the cockpit device 50. In the present embodiment, therefore, the projector 120 is provided with a vibration eliminating mechanism 121 (FIG. 1) to prevent the projected picture of the projector 120 from being vibrated. The mechanism 121 is shown in dashed line to indicate that it is located beneath the projector 120, which is mounted to the mechanism 121. As the vibration eliminating mechanism, the projector 120 of the present invention comprises an optical axis changing means (not shown) which inclines the projected optical axis to the front and rear, and to the left and right. It also comprises an optical axis horizontal moving means (not shown) which moves the projector 120 to the left and right horizontally. Since the cockpit device 50 itself is inclined based on the inclination information informed by the conveyance model 20 in the present embodiment, the projector 120 is inclined by the optical axis changing means to cancel the inclination of the cockpit device 50 so that the projected optical axis is prevented from inclining. In the present embodiment there are times where the cockpit device itself is moved horizontally. Therefore, to prevent the projected picture from moving together with the movement of the cockpit device, the projector 120 is moved horizontally in the opposite direction by the optical axis horizontal moving means to cancel the horizontal movement of the cockpit device 50.

Further, a moving mechanism may be provided onto the display screen 80 so that it will be able to move horizontally, and the display screen 80 may move horizontally to cancel the horizontal movement of the optical axis in the cockpit device 50. If the projector 120 is provided on a foundation which will not be moved by the driving section 70, it is not necessary for a moving mechanism to be provided onto the projector 120 and the display screen.

To project the picture onto a screen curved into an arc of 120° using an ultra wide-angle front television camera 31 and a projector 120 in the present embodiment, a plurality of both the front television camera 31 of the conveyance model 20 and the projector 120 of the simulator body 4 may be provided and controlled so that each of them is in charge of a certain section of the screen 80. In this way, the warp of the picture by the wide-angle lens is omitted to display a more realistic picture. The display screen may be a wider one, not like the screen curved like into an arc of 120° as in FIG. 1. It is preferable for the display screen to be 360° so that the user seated on the driver's seat of the cockpit device 50 can experience a more realistic simulation, because wherever he/she turns, the vision will be covered with the picture of the simulation.

Figure 6:
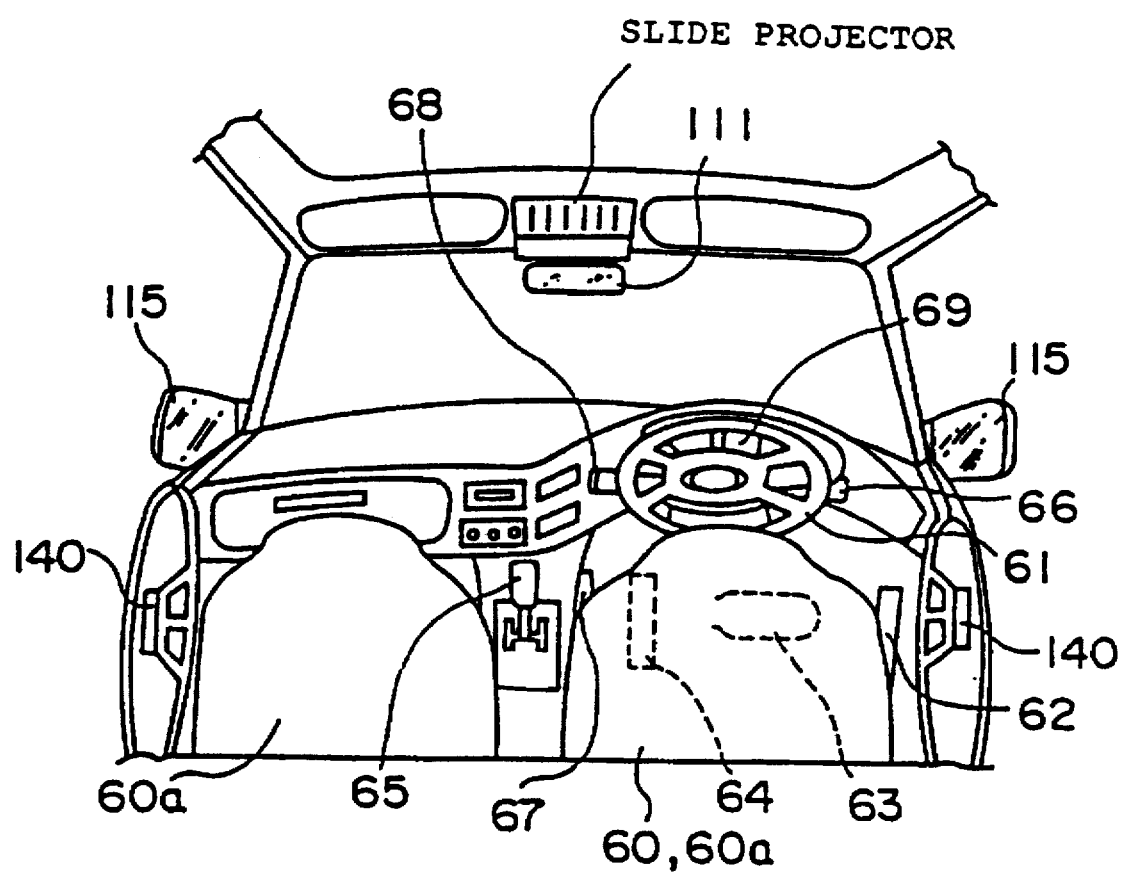
FIG. 6 is a cross sectional view which shows the inside of the cockpit device in an embodiment of the present invention.

The picture control section 100 outputs the rear scenery taken by the rearview-mirror-form liquid crystal television 35a of the conveyance model 20 to the rearview-mirror-form liquid crystal television 111 and the rear scenery taken from the sides by the side-mirror-form liquid crystal television cameras at the left and right to the side-mirror-form liquid crystal televisions 115 at the left and right side respectively. FIG. 6 is a cross sectional view of the cockpit device cut at the line from A to B in the FIG. 1. As shown in FIG. 6, the rearview-mirror-form liquid crystal television 111 is fixed at the front upper section (the position corresponding to the rearview-mirror of a car) of the driver's seat 60 of the cockpit device, and the side-mirror-form liquid crystal televisions 115 are fixed at the left and right of the driver's seat (the positions corresponding to the positions of the side-mirrors of a car). The picture controlling section 100 inverts the left and right pictures and outputs them to the mirror-type-televisions 111 and 115. In the present embodiment, a liquid crystal television is used as the picture display means in place of the display screen 80. Other display means, for example a CRT, etc., may be used as well.

In the present embodiment, the deflection of the picture to be outputted is controlled by the deflection preventing means 30a of the conveyance model 20. However, a picture information processing means may be provided on the picture controlling section 100 at the output section instead of providing the deflection preventing means 30a at the shooting side, so that the picture information inputted from the conveyance model 20 is measured by the accelerometer 40, to output a picture in a stable condition based on the information of the inclinations and vibrations received via the transmitting/receiving device 200 and the transmitting/receiving base 130. The projector 120 itself may be inclined or vibrated to cancel the deflection so that the picture projected on the display screen 80 becomes stable.

In the present embodiment, the television cameras 35a and 35b are specially provided to shoot the picture to be outputted by the rearview-mirror-form liquid crystal television 115 and the side-mirror-form liquid crystal televisions 30 at the left and right.

Figure 3C:
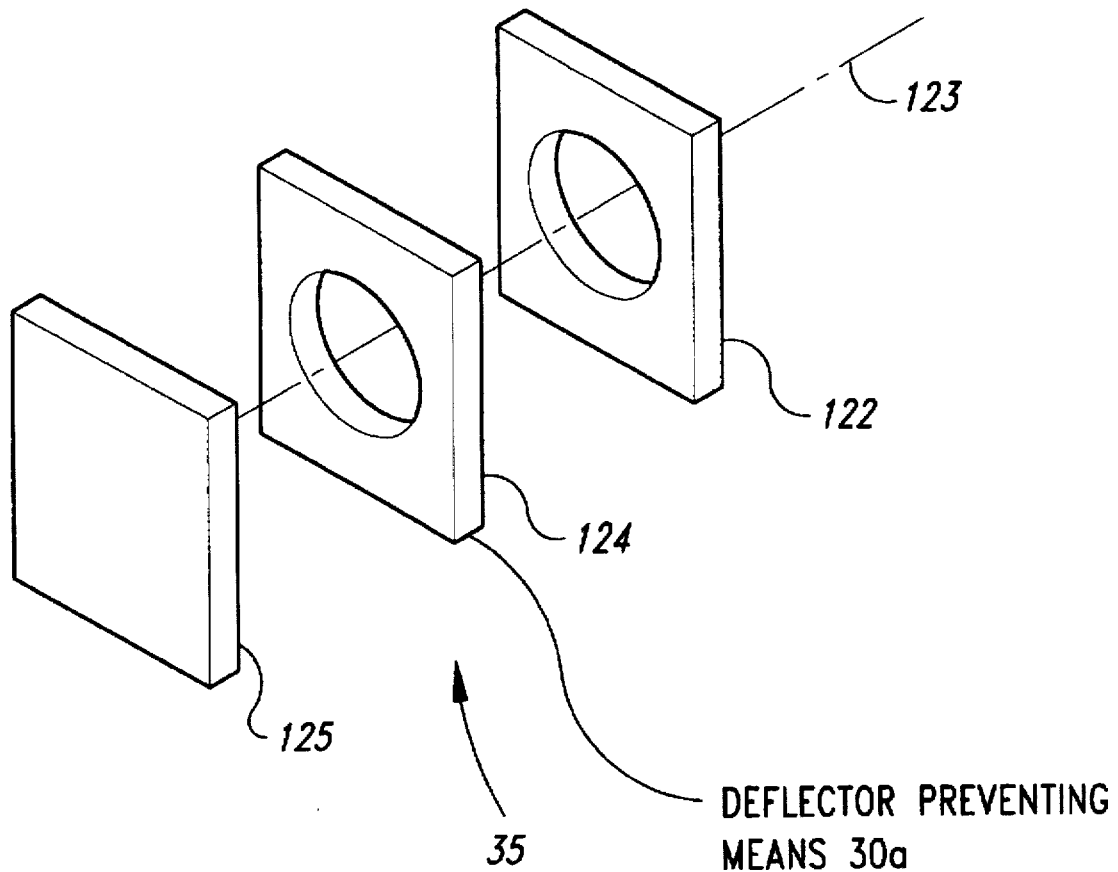
FIG. 3(c) is an isometric view of portions of one embodiment of a television camera that can be used with the present invention.

FIG. 3(c) is an isometric view of an internal portion of one embodiment of a television camera 35, which can be used for any or all of the cameras 35a and 35b. A camera similar to the camera 35 may also be used for the camera 31. A lens 122 receives one or more rays of light 123, refracts the light rays 123 in an appropriate manner and then provides the refracted light rays to an incident light path changing mechanism 124. The mechanism 124, which is coupled to and controlled by the deflection preventing means 30a (FIG. 2), changes the path of the incident light rays 123 according to the degree of deflection, so that the light emitted from a certain position of the scene will be incident at a certain position of the photoelectric conversion means 125 in spite of the deflection. The degree of deflection is based on the information of deflection received from the accelerometer 40 (FIG. 2). The photoelectric conversion means 125 receives the incident light rays 123 from the mechanism 124, and converts these rays into electrical impulses that form a video signal. Although shown as including one lens 122 and one each of the mechanisms 124 and 125, in other embodiments of the invention the television camera 35 may include multiple lenses 122, mechanisms 124, or means 125.

The picture shot by one television camera may be divided to be outputted on the rearview-mirror-form liquid crystal television 115 and the side-mirror-form liquid crystal televisions at the left and right. In this way, the number of television cameras to be loaded on the conveyance model 20 can be decreased, which is effective in miniaturizing the conveyance model and making it light.

Figure 8:
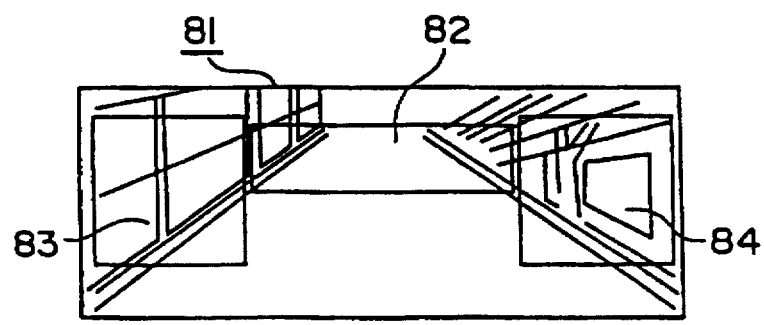
FIG. 8 is a figure which explains the relationship between the picture taken by the rear television camera, rearview-mirror-form liquid crystal television, and side-mirror-form liquid crystal television in an embodiment of the present invention.

In this case, a television camera which can shoot a visual field in larger wide-angle than the television camera for the rearview mirror, 35a, is provided at the position of the television camera for the rearview-mirror, 35a, as a rear television camera 35 to replace the television camera for the rearview mirror, 35a, and the television camera 35b for the side mirrors at the left and right. The picture shot by the rear television camera 35 is passed to the picture controlling section 100 which divides the vision of the picture information and outputs them to each of the liquid crystal televisions 111 and 115. In other words, the picture controlling section 100, as shown in FIG. 8, inverts the left and right picture information. The picture controlling section 100 then outputs: the center portion of the area 82 to the rearview-mirror-form liquid crystal television 111; the left portion of the area 83 to the side-mirror-form liquid crystal television 115 at the right; and the right portion of the area 84 to the side-mirror-form liquid crystal television 115 at the left. The process of inverting the left and right picture information can be done before dividing the areas, or after dividing the areas as in the present embodiment.

b) Cockpit Device

The cockpit device 50 is an operating device which has an appearance (a car for example) of an enlarged conveyance model 20 which comprises an input section for operating, 60, a meter panel 69, speakers 140, and a controlling section for the cockpit device, 230, within.

The input section for operating, 60 is a device which receives the operation information input from the output information collecting device 3. The received operation information is passed to the output information collecting device 3 via the transmitting/receiving device 200.

The meter panel 69 comprises a speedometer, a tachometer, a fuel indicator, and a distance recorder. On the meter panel 69, the value calculated and determined by the controlling section for the cockpit device, 230, based on the data received from the output information collecting device is outputted.

The input section for operating, 60, comprises a driver's seat within, so that the user can experience the simulation by actually sitting on the driver's seat inside and to input the operation information from the surrounding input members (the handle and the various levers) of the input section for operating, 60.

The inside of the cockpit device 50 strictly reproduces the size, interior fitting of, and feeling of the actual object which was made the model of simulation (a car in the present embodiment). The cockpit device 50 of the present embodiment reproduces the entire car. It may however only be the front half portion of a car if the section of the driver's seat is included.

The cockpit device 50, as shown in FIG. 6, comprises two front seats 60a wherein one of them (the right side in the present embodiment) is a driver's seat 60. An input section for operating, 60, such as a handle 61, an accelerator pedal 62, a brake 63, a clutch pedal 64, a shifting lever 65, a direction indicator 66, an emergency brake 67, a light, wiper indicators 68, and a meter panel 69 are provided around the driver's seat 60.

Four speakers 140 are embedded inside the front and back of the doors at both sides. The number of speakers is not limited to this because a more realistic sound effect can be obtained by using more speakers. By converting the sound effect information collected and received from the mikes 301 of the conveyance model 20, the sound made around the conveyance model 20 is sent stereophonically inside the cockpit device 50. The sound signals can be trigger signals to output a predetermined sound, or a sound converted so as to be exaggerated, instead of directly outputting the generated sound from the speakers 140. In this way, more impressive sounds can be generated.

An automatic car can be the model of the cockpit device 50 instead of the manual car used in the present embodiment. In this case, the clutch pedal 64 will be unnecessary, and the shifting lever 65 has to be one used for automatic cars.

An imaginary speed determined based on the speed measured by the speed detector 40a of the conveyance model is displayed on the speedometer. In other words, the controlling section for the cockpit device, 230 determines the value obtained by dividing the actual speed of the conveyance model 20 by its contraction scale ratio i.e. an imaginary speed of a case when the conveyance model 20 and the running area 10 are in actual sizes, and displays it to the speedometer. For example, when the contraction scale ratio of the conveyance model 20 and the running area 10 is 1:50 and the speed of the remote control car at 50 cm per second, the imaginary speed displayed onto the speedometer will be 25 m per second, i.e. 90 km per hour. If a speed detector which outputs the imaginary speed is used, this kind of calculation will be unnecessary, and the informed data can be displayed as they are. A distance detector may be provided instead of the speed detector 40a of the present embodiment so that the running distance is detected at a certain timing, to display an imaginary speed obtained by dividing the speed determined from the detected running distance with the contraction scale ratio.

At the distance recorder of the controlling section for the cockpit device, 230, the value (an imaginary distance) determined by dividing the distance measured by the speed detector 40a of the conveyance model 20 with the contraction scale ratio of the running area. The imaginary distance may be determined by multiplying the length of time from the beginning of driving and the mean of the above imaginary speed from the beginning of driving, together, instead of providing a means for detecting distance in the conveyance model 20. If the speed detector 40a is made to output the imaginary distance, this kind of calculation will be unnecessary, and the data can be displayed as they are. The initial value of the imaginary distance displayed on the distance meter at the beginning of the simulation is zero meters.

Moreover, the controlling section for the cockpit device 230 displays the number of rotations of the imaginary engine onto the tachometer. In other words, in a condition when the simulation has begun (the engine has been started) but the acceleration pedal 62 is not pressed, the controlling section for the driving section, 230, displays 600 rotations per minute. When the acceleration pedal 62 is pressed, the controlling section for the driving section, 230, controls the number of rotations according to the angle of the acceleration pedal being pressed (which is 0° when not pressed and 90° when pressed at maximum). In other words, the controlling section for the driving section, 230, displays the number determined by adding 600 to the number determined by multiplying 80 to the angle being pressed as the number of rotations, to display it onto the tachometer. Other than the condition of pressing of the acceleration pedal 62, the condition of the loading actually applied to the driving motor of the conveyance model 20 may be detected to determine the number of rotations.

The controlling section for the cockpit device, 230, calculates the imaginary fuel amount consumed per part of an hour (one minute in the present embodiment) based on the imaginary number of rotations of the engine, subtracts the imaginary fuel amount from the fuel amount displayed at that time on the fuel indicator to determine the fuel amount, and displays the determined fuel amount on the fuel indicator. In the present embodiment, the imaginary fuel amount to be consumed is 1 over 40 ml per 100 rotations of an imaginary engine wherein the fuel is used up after 2,400,000 rotations. The starting value of the fuel amount (the fuel amount at the beginning of the simulation) is 60 liters.

The display on the tachometer and the fuel indicator is not done by assuming a car as above, but by providing a means which actually determines the actual number of rotations of the drive motor of a real remote control car 20 and the actual capacity of the battery.

c) Driving Section

The driving section 70 comprises a both sides moving mechanism 71, a front/rear moving mechanism 75, an up/down moving mechanism 78, and a controlling section for the driving section 210 which controls the movements of each moving mechanisms 71, 75, and 78, to move the cockpit device 50. The driving section also comprises a spring 79, which is a supporting member, to support the weight of the cockpit device 50. The operation of the driving section 70 is controlled by the controlling section for the driving section 210, based on the moving information collected from the accelerometer 40 and the speed detector 40a. In other words, the controlling section for the driving section, 210, is measured by the accelerometer of the the conveyance model 20, and based on the acceleration information received via the communication circuit 2, each type of oil hydraulic cylinder provided on each moving mechanism 71, 75, and 78 of the driving section is driven to incline and slide the cockpit device so that the user seated inside the cockpit device can experience bodily sensations. The driving section 70 displaces the cockpit device 50 at a speed in proportion to the size of the acceleration and in the informed direction of the acceleration. If centrifugal force is included in the acceleration, the up/down moving mechanism 78 is operated to incline the car body in the direction of taking a curve. Only the necessary portions of the vibration information can be taken out by the controlling section for the driving section, 210, to be used in controlling each moving mechanisms 71, 75, and 78. Since the remote control car which is a conveyance model 20 is lighter in reality, it vibrates subtly unlike a real car. By the above method, however, the subtle vibrations specific to the conveyance model 20 are taken away so that vibrations and accelerations more similar to an actual car can be reproduced.

When the detected accelerations show the acceleration, the controlling section for the driving section, 210, drives the oil hydraulic cylinder 77a for moving to the front and the rear to move the cockpit device to the front. The speed of moving gets faster as the acceleration becomes larger according to the size the detected acceleration. After moving to the front, the controlling section for the driving section, 210, returns the cockpit device 50 slowly to the starting position.

When the detected acceleration shows deceleration (including sudden stop), the controlling section for the driving section, 210, drives the oil hydraulic cylinder 77a for moving to the front and the rear to move the cockpit device to the rear. The speed of moving gets faster as the acceleration becomes larger according to the size of the detected acceleration. After moving to the back, the controlling section for the driving section, 210, returns the cockpit device 50 slowly to the starting position.

When the detected acceleration is in one of the side directions (when the moving direction is curved so that centrifugal force is generated), the controlling section for the driving section, 210, drives both sides moving oil hydraulic cylinders 74a, 74b to move the cockpit device to the left or the right, in the opposite direction of the acceleration vector (right at a right curve and left at a left curve). The moving speed becomes faster as the size of the absolute value of the acceleration becomes larger. At the same time, the controlling section for the driving section, 210, drives each of the up/down moving mechanism 78a and 78b at the left and the right of the up/down moving mechanism 78 to incline the cockpit device to either the left or the right (right at a right curve and left at a left curve). When the acceleration to the sides is not detected after moving, the controlling section for the driving section, 210, returns the cockpit device 50 to the starting position by slowly returning the inclination to be horizontal.

When the accelerometer 40 detects the inclination of the conveyance model 20, the controlling section for the driving section, 210, drives the up/down moving mechanism 78 to incline the cockpit device 50 as the detected inclination. In other words, when it is detected that the conveyance model 20 is inclined to the back (the front part of the car body is at a higher position than the back part of the car body), the controlling section for the driving section, 210, drives the up/down moving mechanism 78 to incline the cockpit device 50 to the back as the detected inclination.

In the present embodiment, the movements of each of the moving mechanisms 71, 75, and 78 are controlled based on the actual acceleration put of the conveyance model which is detected by the accelerometer 40, so that the bodily sensation of the acceleration is simulated at the cockpit device 50. However, the movements of each of the moving mechanisms 71, 75, and 78 may be controlled based on the operation information inputted by the input section for operating 60. In other words, if the inputted operation information is of a curve, the two sides moving mechanism 71 is operated. If it is of a right curve, the cockpit device 50 is slid to the right, and it is of a left curve, the cockpit device 50 is slid to the left. By the angle of the curve, the speed of sliding is changed and the up/down moving mechanism 78 at the left and right is operated to incline the car body to the direction of the curve. When acceleration and deceleration are inputted, the front/rear moving mechanism 75 is operated. If it is of acceleration, the cockpit device 50 is slid to the front and if it is of deceleration the cockpit device 50 is slid to the back.

Figure 7:
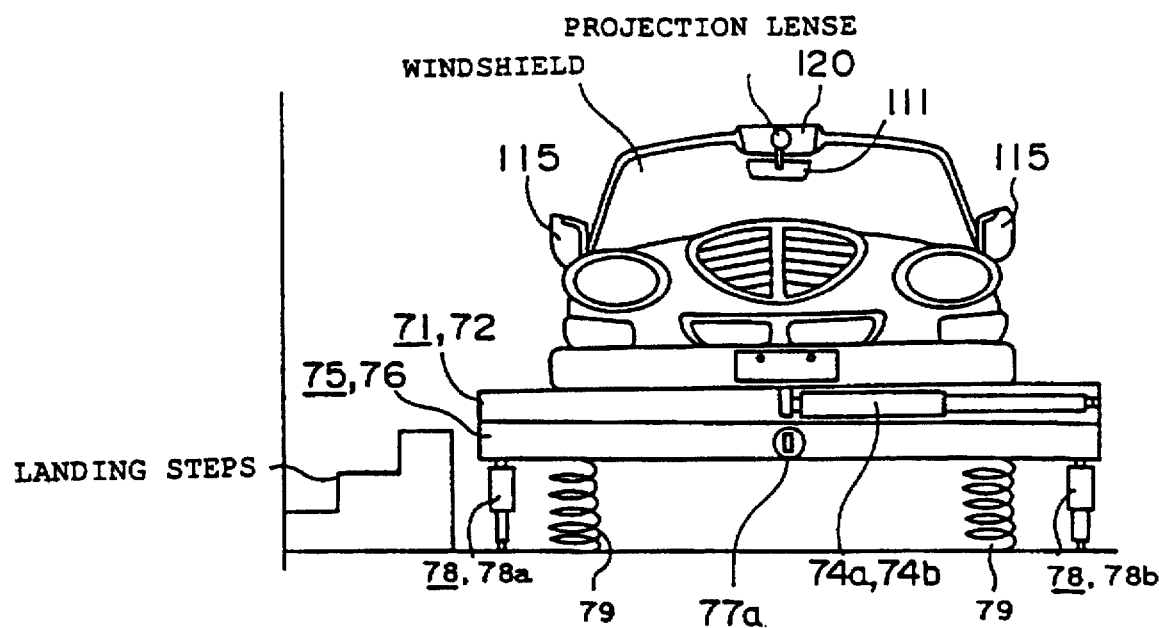
FIG. 7 is a front view of the cockpit device and the driving section in an embodiment of the present invention.

As shown in FIG. 1 and FIG. 7, the driving section 70 comprises, a both sides moving mechanism 71, a front/rear moving mechanism 75, and an up/down moving mechanism 78. The both sides moving mechanism 71 comprises a base board 72 for moving to the sides, a both sides moving front oil hydraulic cylinder 74a (one at the front and one at the rear) and a both sides moving rear oil hydraulic cylinder 74b for moving to the sides (one at the front and one at the back). The front/rear moving mechanism 75 comprises a base board 76 for moving to the front and the rear, a rail 77 for moving to the front and the rear, and the cylinder 77a for moving to the front and the rear. The up/down moving mechanism 78 comprises a spring 78a for compressing, a right side up/down moving mechanism, and a left side up/down moving mechanism. The base board 72 for moving to the sides becomes a front/rear moving board.

The mechanism which can slide to the front/rear direction is for producing sensations relating to starting, acceleration, sudden starting, sudden acceleration, normal brake operation, emergency brake operation, and collisions. The mechanism which can slide to both sides is for producing the stresses at times of lane changing, curves and sharp curves.

B) The Operation of each of the components of the simulation system in the Present Embodiment The signal from the accelerometer 40 gives the body inclination and the vibration of the remote control car 20 to the cockpit device 50 where the game player is seated, via the transmitter 23 and the transmitting/receiving base 130.

When the body of the remote control car 20 inclines and vibrates, the picture shown by the television camera 30 loaded on the remote control car 20 will be slanted and shaken if there is no deflection preventing means. If this picture is shown on the front picturing screen 80 as it is, the pictures on the front picturing screen 80 will be slanted and shaken. These are only visual information, and the simulation will be one without realism. By using the signal of the accelerometer 40, the inclination and the vibration of the body of the remote control car 20 is given to the cockpit device 50 so that a inclination and the vibration of the body of the remote control car 20 can be reproduced.

The various output signals obtained via the input section 60 for driving are transmitted from the transmitter of the transmitting/receiving base 130 to the receiver 23 of the remote control car 20, so that the remote control car 20 moves according to the operating information. The position detection (operation detection) of a handle 61, an accelerator pedal 62, a brake 63, a clutch 64, a shifting lever 65, a direction indicator 66, a side brake 67, and a light switch 68 which comprises the input section 60 for driving is conducted, and the position detection signals are sent to the remote control car 20 as operation information.

As for the side brake 67, the winker 66, the light switch 68, and the shifting lever 65, a display is carried out at an appropriate position within the cockpit device 50. In this case however, the outer sections of the simulator body, i.e. the light, side light, the direction indicator etc., fixed outside the cockpit device 50 do not operate.

For wipers, no signal is sent to the remote controls car 20 side, and so no wiper operation is conducted at the remote control side. In this case, the wiper fixed at the outer section of the cockpit device 50 operates to wipe the front glass like a real wiper. This is not to cause rain at the remote control car 20 side but to gain a bodily sensation at the cockpit device 50 side when producing a rainy scene.

When causing rain at the remote control car 20 side, the wiper is operated in front of the loaded television camera 30 because if the wiper is taken as a picture, it will be shown on the front picturing screen 80 at the cockpit device 50 side, and realism will be lost.

By providing speakers 140 at the inner side the door, the car engine sound comes out and the sound of overtaking a car and the sound when being overtaken by a car come up from the front or the back and recede.

A video projector 120 fixed to the upper section at the front of the cockpit device 50 projects the picture sent from the remote control car 20 onto the front picturing screen 80 provided at the front surface of the cockpit device 50.

By using the front/rear moving mechanism 75, the stresses in the front/rear direction at times of starting, acceleration, sudden starting, sudden acceleration, normal brake operation, emergency brake operation, and collisions caused by the accelerator pedal 62 and the brake 63 of the cockpit device 50 are produced.

By using the both sides moving mechanism 71, the stresses at times of lane changing, curves and sharp curves caused by the operation of the handle 61 of the cockpit device 50 can be produced.

Figure 9:
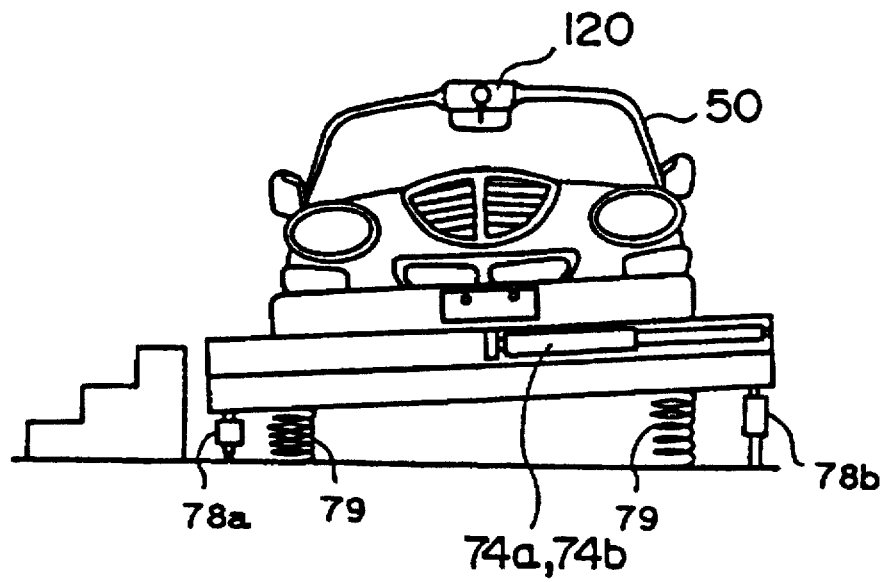
FIG. 9 is a front view of the cockpit device and the driving section slanted to the right, in an embodiment of the present invention.
Figure 10:
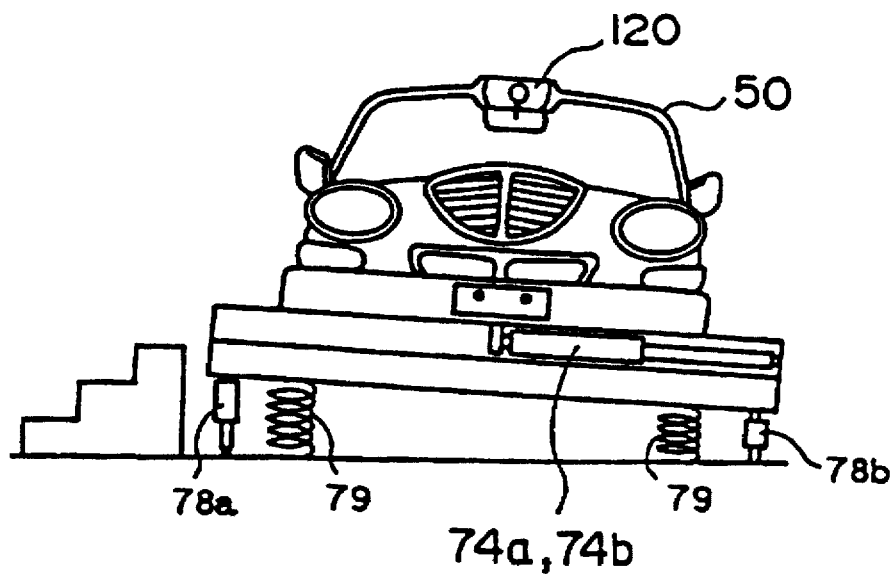
FIG. 10 is a front view of the cockpit device and the driving section slanted to the left, in an embodiment of the present invention.
Figure 11:
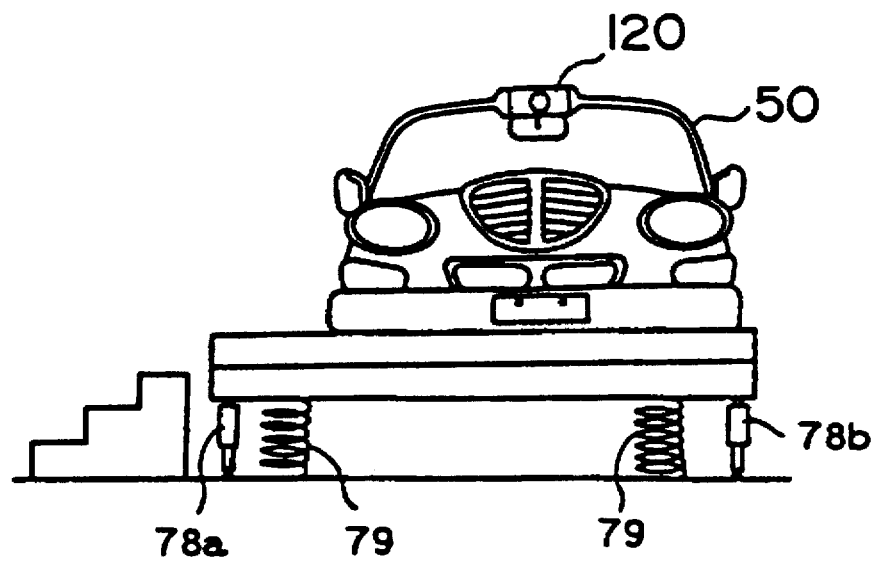
FIG. 11 is a front view of the cockpit device moved to the right and the driving section in an embodiment of the present invention.
Figure 12:
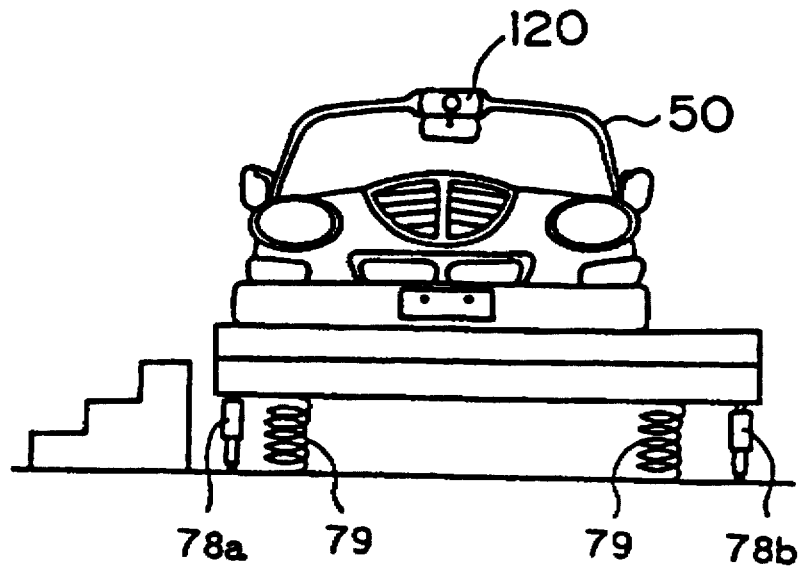
FIG. 12 is a front view of the cockpit device moved to the left and the driving section in an embodiment of the present invention.

As shown in FIG. 7, the cockpit device 50 is in a stable condition of a stop or a normal running condition. The cockpit device 50 is supported by four springs and four oil hydraulic cylinders. The hydraulic cylinders are contracted and expanded by the signals sent to each tire. When going downhill, the front oil hydraulic cylinders are contracted, when going uphill, the rear oil hydraulic cylinders are contracted, and when the road is slanting to a side, the car body is slanted as shown in FIGS. 9 and 10. At a curve, the cockpit device 50 is slid to the left and right by a left/right moving oil hydraulic cylinders, as shown in FIGS. 11 and 12.

When turning to the right it is slid to the right while when turning to the left it is slid to the left. The speed of sliding may be changed and the inclination of the cockpit device 50 may be added according to the way of turning so that the bodily sensation associated with acceleration given to the player can be increased.

In cases of starting, sudden starting, acceleration, sudden acceleration, deceleration, sudden deceleration, stopping, and sudden stopping, movements are reproduced by the operation of the front/rear moving oil hydraulic cylinder which moves the cockpit device 50 to the front and rear.

In cases of starting, sudden starting, acceleration, and sudden acceleration, the cockpit device 50 is slid to the front, while it is slid to the back in cases of deceleration, sudden deceleration, stopping, and sudden stopping. The inclination of the simulator body 50 to the front and rear may be added to this movement so that the bodily sensation associated with acceleration given to the player can be increased.

By combining the front/rear/left/right slides and the inclinations timely, real movements can be reproduced. In a case of a jump, the entire cockpit device 50 is moved up and down to reproduce the jumping movement.

At a remote control car 20, conveyance model control section is loaded to control the rotating speed and the rotating direction of the motor (which corresponds to the engine), the light, side light, the winker, and direction of the tire by the signals sent from the cockpit device 50, so that the model moves according to the directions from the cockpit device 50.

At the simulation system 1 of the present embodiment, a condition wherein a monster comes out to obstruct the running, or a fight with a group of reckless drivers can be made just like a game, by providing them in the running area 10. However, the game conducted by the simulation system of the present embodiment can be made in such a way that the player waits to be saved by a rescuer, not like an ordinary television game where the game continues after a fast recovery from the damage. The rescuer may be a remote control car 20 driven by other players, or a rescue party composed by the game sponsors.

The remote control car 20 and the cockpit device 50 are of designs which fit the atmosphere of the set. The bigger and more accurate the set is, the more realistic it will be.

The simulation system 1 of the present embodiment may be used as a bodily sensation game machine. It is not, however, like general bodily sensation game machines programmed to give bodily sensations by shaking the device according to the predetermined pictures or like bodily sensation game machines where pictures are generated by operating the computer graphics. The player inside the cockpit device 50 actually runs the remote control car 20 on the road of a running course 10 via the cockpit device 50, and the signals of the view and vibrations at that time are sent to the cockpit device 50 so that the player inside the cockpit device 50 can actually sense the pictures and vibrations as if he/she was inside the remote control car 20, and unexpected bodily sensations can be gained. Further, the simulation system of the present embodiment can be used for practicing driving and operating, as well as being used as a game machine.

Other than a car, the conveyance model 20 may be a model of a space ship, an airplane, a ship, a submarine, and so on. When simulating ships, submarines, and the like, a large water tank may be used in place of the running area 10 to operate the conveyance models 20 of a ship, a submarine, a diving boat, etc. When simulating a space ship or an airplane, a water tank may be used in place of the running area 10 so that buoyancy of water and other liquids will reproduce the feeling of floating in air or space.

According to the simulation system 1 of the present embodiment, the conveyance model is actually moved in the running area of the model according to the operation information inputted by the player, and the simulation is conducted using the information received from the conveyance model, to let the player quasi-experience a more realistic driving.

According to the present invention, a realistic simulation can be conducted.

What is claimed is:

1. A simulation system comprising a simulator body which simulates the operation of a conveyance model, an output information collecting device for collecting control information from and providing operation information to said simulator body, and a communication circuit which joins said simulator body and said output information collecting device, wherein:

the output information collecting device comprises the conveyance model, which operates according to the control information received from the simulator body;

the conveyance model comprises a television camera which shoots the surrounding view to pass the obtained picture information to the simulator body via the communication circuit, and comprises an acceleration detector which detects the acceleration of the conveyance model and provides the obtained information of the acceleration to the simulator body via the communication circuit, the acceleration detector providing the obtained information of the acceleration as part of the operation information;

the simulator body comprises a cockpit device that includes an operating seat, a driving section that is operable to move the cockpit device, and an output section which displays the picture taken by the television camera; and the driving section operable to receive the part of the operation information and operable to move the cockpit device according to the information of acceleration provided by the acceleration detector.

2. The simulation system according to claim 1, wherein said output section comprises a displaying device provided at the front section of said cockpit device and a projector which projects the picture taken by said television camera to the displaying device, and the projector is supported in such a condition that it is not subject to influence of the movement of the cockpit device.

3. The simulation system according to claim 2, wherein said projector is supported independently of the cockpit device.

4. The simulation system according to claim 2, wherein said projector comprises a vibration eliminating mechanism that is operable to move the projector so as to compensate for the movement of the cockpit device.

5. The simulation system according to claim 4, wherein said vibration eliminating mechanism comprises an optical axis changing mechanism that changes the direction and the position of the optical axis, and the optical axis changing mechanism displaces the optical axis projected by said projector to cancel the displacement of the cockpit device by said driving section.

6. The simulation system according to claim 1, wherein said television camera comprises a shooting section, and wherein;

said shooting section comprises a photoelectric conversion mechanism which converts light to electric signals, an optical system which conducts the image of the subject to the photoelectric conversion mechanism, and an incident light path changing mechanism which is operable to change the path of the light within the optical system that is incident upon the photoelectric conversion mechanism; and said conveyance model detects the degree of deflection based on the acceleration information received from said acceleration detector and comprises a deflection controlling mechanism coupled to the light path changing mechanism which changes the light path of the incident light according to the degree of deflection so that the light emitted from a certain position of the object of shooting will be incident at a certain position of the photoelectric conversion mechanism in spite of the deflection.

7. The simulation system according to claim 1, wherein said conveyance model and said cockpit device comprise models of a car.

8. The simulation system according to claim 7 wherein:

said television camera comprises a front television camera which shoots the front view from the conveyance model and a rear television camera which shoots the rear view from the conveyance model;

the output section further comprises a rearview-mirror-form displaying device and side-mirror-form displaying devices at the left and right sides of the cockpit device;

the picture shot by the front television camera is displayed on the displaying device provided at the front section of said cockpit device; and one section of the picture shot by the rear television camera is displayed on the rearview-mirror-form displaying device, a first remaining section is displayed on one of the left and right side-mirror-form displaying devices, and a second remaining section is displayed on the other side-mirror-form displaying device.

9. The simulation system according to claim 7, wherein:

said television camera comprises a front television camera which shoots the front and a rear television camera which shoots the rear;

the rear television camera comprises a first television camera for side-mirrors which comprises lenses for shooting at each of the left and right positions of the side-mirrors in said conveyance model and a second television camera for the rearview-mirror which comprises lenses for shooting at the center section of the conveyance model;

the output section further comprises a rearview-mirror-form displaying device and side-mirror-form displaying devices at the left and right sides; and the pictures shot by the front television camera are displayed on the displaying device provided at the front section of said cockpit device, the pictures shot by the second television camera for the rearview-mirror are displayed on the above rearview-mirror-form displaying device, the pictures shot by the lens for shooting at the right side of the first television camera for side-mirrors are displayed on the above rearview-mirror-form displaying device at the right, and the pictures shot by the lens for shooting at the left side of the first television camera for side-mirrors are displayed on the rearview-mirror-form displaying device at the left.

10. The simulation system according to claim 1, wherein said driving section comprises:

a front-and-rear moving mechanism which displaces said cockpit device to the front and rear;

a both-sides moving mechanism which displaces the above cockpit device to the left and the right;

an up-and-down moving mechanism which displaces the above cockpit device up and down; and a controlling section for the driving section which simulates the acceleration of the conveyance model at the cockpit device by controlling the above front-and-rear moving mechanism, both-sides moving mechanism, and up-and-down moving mechanism.

11. The simulation system according to claim 10, wherein said controlling section for the driving section decides the direction and speed of the cockpit device based on the information of acceleration of said conveyance model provided by said acceleration detector.

12. The simulation system according to claim 10, wherein said controlling section for the driving section decides the direction and speed of the cockpit device based on the operation information received by said driving section.

13. The simulation system according to claim 1, wherein said conveyance model and said cockpit device are models of a ship, the conveyance model disposed in a water tank.

14. The simulation system according to claim 1, wherein said conveyance model is a model of a train, said cockpit device is a model of a locomotive, and said conveyance model operates in a running area that comprises a model of a railroad.

* * * * *